Jan. 11, 1949.  R. C. CAMPBELL  2,458,893
APPARATUS FOR CONDUCTING ION EXCHANGE OPERATIONS
Filed Oct. 6, 1945  3 Sheets-Sheet 1

INVENTOR:
ROBERT C. CAMPBELL,
BY Arthur Middleton
ATTORNEY

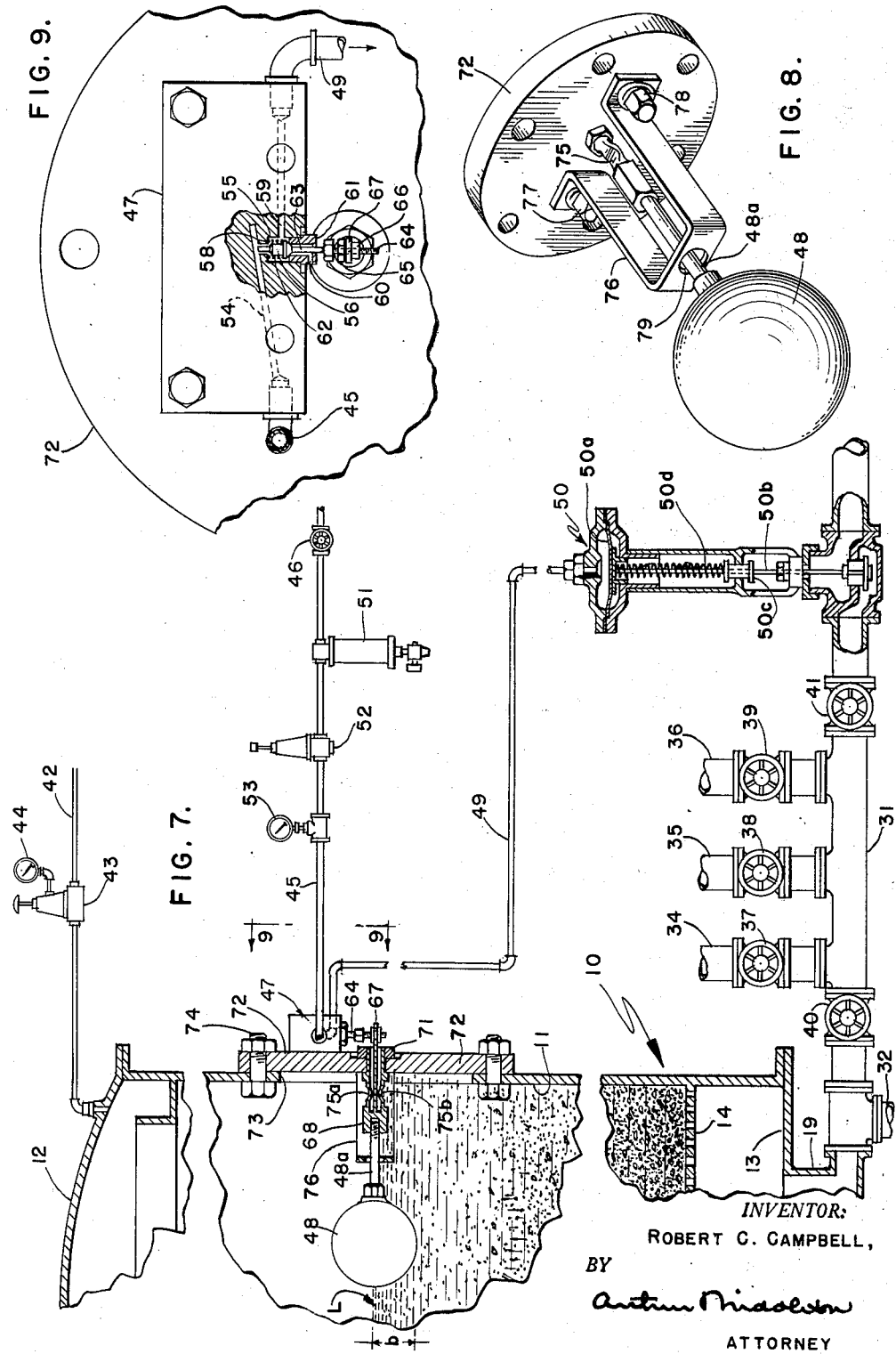

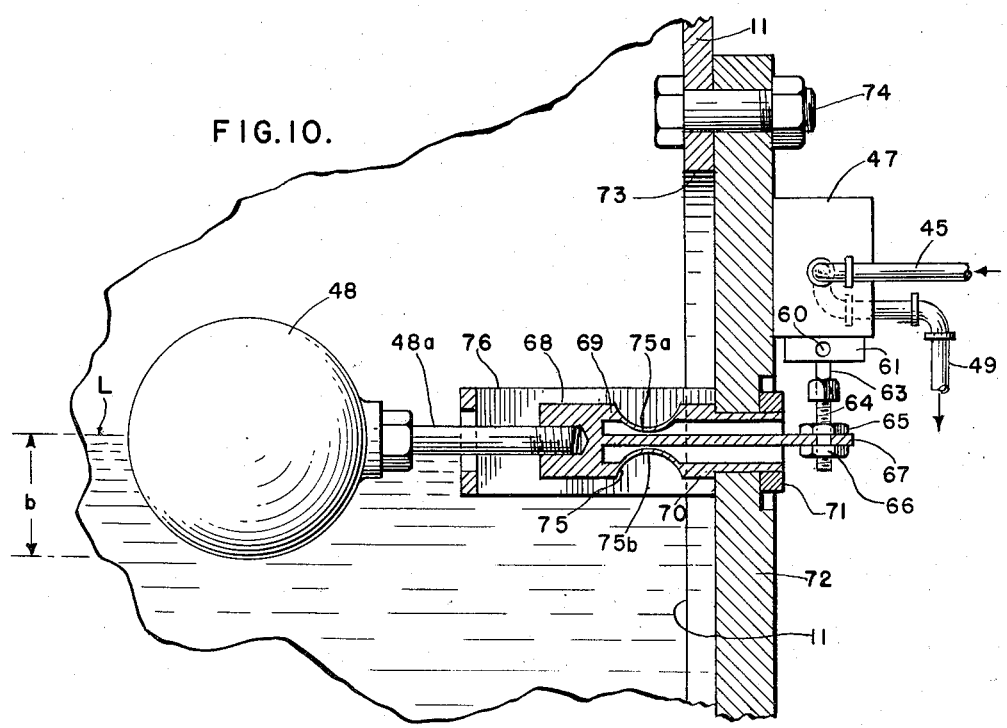
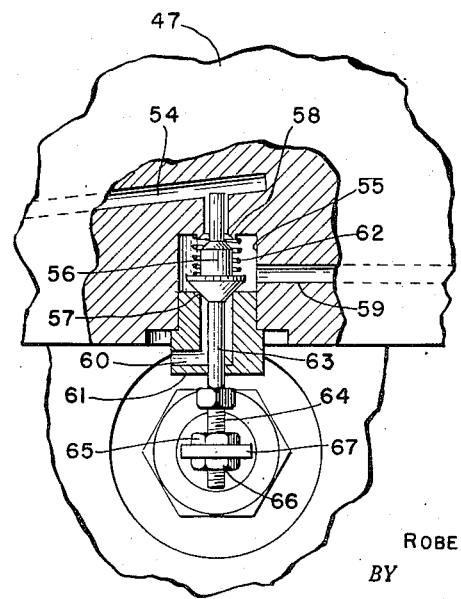

Patented Jan. 11, 1949

2,458,893

UNITED STATES PATENT OFFICE 2,458,893

APPARATUS FOR CONDUCTING ION EXCHANGE OPERATIONS

Robert C. Campbell, Milburn, N. J., assignor to The Dorr Company (Inc.), New York, N. Y., a corporation of Delaware Application October 6, 1945, Serial No. 620,723

2 Claims. (Cl. 210—24)

This invention relates to ion exchange operations. According to one aspect this relates to control equipment for the operation of an exchanger cell. According to another aspect this relates to the ion exchange treatment of sugar-bearing solutions from which dissolved impurities such as ionized salts are to be removed by way of treatment with ion exchange materials. Such removal of ionized impurities is therefore also known as de-ionization treatment.

The principle of de-ionization treatment as such of solutions is now well known in the art, and comprises subjecting the solution sequentially to cation- and anion exchange treatment by means of special cation- and anion exchange materials whereby the dissolved salts are abstracted from the solution and replaced with the molar equivalent of pure water.

That is to say, the solution to be treated when passing through a properly regenerated bed of granular cation exchange material gives up its cations to that material receiving in turn from the material the molar equivalent in H-ions whereby the solution becomes correspondingly acidified. Thereupon the acidified solution is passed through a bed of granular anion exchange material which causes the solution to give up the anion of the acid to the material and to receive in exchange OH-ions (hydroxyl ions) from the material. Thus, in the treated solution, effluent resulting from the second or anion exchange treatment phase has received progressively for its dissolved salts the molar equivalent of HOH, namely pure water. In this art, the anion exchange material is also termed an acid-removing material since the net result of its function is the removal of the acid from a solution.

The exhaustion of an exchanger bed in submergence while the solution is passing downwardly therethrough, proceeds in continuous downward fashion through the bed. That is, a dividing line or rather zone of transition between an upper exhausted portion of the bed and the complementary lower portion of the bed which is not yet exhausted. In other words, this dividing line or zone between the exhausted and the unexhausted portion of the bed keeps shifting downwardly through the exchanger bed as the existing solution flowing therethrough leaves an increasing exhausted exchanger portion behind while passing through a correspondingly decreasing portion of unexhausted or active exchanger material. Since the dividing line is not a sharp one, there will be noticed a slowing down of exchange intensity as the exhaustion approaches the bottom of the exchanger bed. In the case of the H-ion exchange cycle, that is, cation exchange phase in the de-ionization treatment of a raw water the final stages of exhaustion are indicated by rising of the pH effluent water. Eventually a more or less sudden rise in pH is observed indicating that the bed requires regeneration since the so-called "break through" has been reached. The subsequent regeneration of the exchanger bed takes place progressively in a manner similar, although chemically in reverse, to the process of exhaustion.

When the respective exchange materials have had their exchange capacity exhausted by the continued flow or percolation therethrough of the solution being treated, they must be regenerated. For regeneration the cation exchanger requires an acid solution while the anion exchanger requires an alkali solution. Well known exchanger materials for this purpose (known also as organolites because of their organic character and in distinction from the inorganic zeolites) are of synthetic resinous nature and are regenerable respectively with a strong mineral acid such as $H_2SO_4$, and with a strong alkali such as $Na_2CO_3$ both of suitable concentration.

Such exchange materials, for example, are of the kind that are prepared by the condensation of a dissolved organic chemical of a group comprising sulfonated phenols and aromatic amines.

A known organic cation exchange material may be described as a synthetic resin of the polyhydric phenol formaldehyde type which is sulphited to a degree such that its sulphur content is not less than 2.4 per cent.

A known organic anion exchange material is an insoluble resin-like product obtained by the reaction of formaldehyde with an aromatic amine.

Consequently, when being de-ionized in this manner sugar solution passes first through a period of acidification and then through a period of de-acidification. However, under these conditions the treatment of the sugar solution presents a problem, since in an acid environment the sucrose contained in the solution is more or less subject to a spontaneous chemical change known as inversion, that is the sucrose is turned into invert sugars. The extent of such inversion grows with the degree of acidity as well as with the time of detention of the solution in the acid environment, and also with the temperature of the solution. Thus a quantity of sucrose that is potentially crystallizable will turn into invert sugar which is non-crystallizable and as such constitutes a loss where crystallized sugar is the desired end product.

In order to discourage inversion it is desirable to keep the temperature of the sugar solution sufficiently low and its detention time sufficiently short.

In the patent application of F. N. Rawlings, Serial No. 376,717, now Patent Serial Number 2,413,844, it has been proposed to cool the normally hot sugar solution prior to its passage through the cation exchange bed.

I propose to minimize the detention time of the sugar solution in transit through the bed by a method of liquid level control whereby there is maintained a minimum of excess volume of liquid above the bed of exchange material. This means that the liquid level be maintained within a predetermined upper and a predetermined lower limit and so that the level is kept relatively close to the top of the bed yet substantially without exposing same since the bed must remain submerged for proper functioning.

An undue rise of the level may be caused when the flow resistance of the bed increases gradually in the course of exhaustion of the bed by the downward flow of the sugar solution therethrough. An undue drop of the solution level may be caused by a spontaneous increase of the gaseous fluid volume in the free-board space of a closed-tank, such as may be due to gases forming or emanating from the sugar solution, for instance, when gas-producing side reactions occur along with the exchange reaction.

An advantage of controlling the liquid level in relation to the top surface of the exchanger bed lies furthermore in the fact that an undesirable intermixing is avoided between a possible excess volume of sugar solution above the bed with wash water that is being used for downwardly displacing the solution from the bed when the bed is exhausted. Similarly, an undesirable intermixing is avoided in the regeneration of the bed when residual unspent regenerant solution is being displaced downwardly through the bed by wash water, and when the wash water consumption is to be minimized.

According to one aspect this invention may be said to constitute an improvement upon the method and system of operating an exchanger bed as disclosed in the Patent No. 2,365,221.

This invention has for its object to produce a liquid level control system adapted to effect liquid adjustments for the purpose set forth, which is positive and substantially instantaneous and precise in action. Another object is to effect such adjustments of the liquid level automatically.

According to this invention control of the solution level in the desired manner relative to the top of the exchanger bed is realized by maintaining constant the air pressure in the freeboard space of a closed tank, while varying the hydraulic flow resistance in response to and against spontaneous fluctuations of the solution level. Such control variation is to be effected by a valve governing the flow of effluent solution passing from the bed.

According to one feature the automatic control system comprises means for automatically maintaining constant air pressure of suitable magnitude in the free-board space above the liquid level and means whereby fluctuations of the liquid level are utilized to effect proportionate adjustment of the effluent control valve.

According to another feature the setting of the effluent valve is effected by compressed air actuating a diaphragm equipped effluent control valve, the compressed air supply for the valve in turn being under the control of a float which rises and falls with the liquid level.

Other features relate to structural details and combinations in the automatic control system.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figs. 1 to 6 are diagrammatic views illustrating various phases of the operating cycle in the ion exchange treatment of a solution, and diagrammatically indicating the disposition of the level control devices.

Fig. 7 is an enlarged showing of the disposition of the level control devices.

Figs. 8 and 9 are further enlarged showings of component parts of the float-controlled device (Fig. 8) representing the mounting of the float per se in perspective, and (Fig. 9) a view taken on line 9—9 in Fig. 7 of the double acting float controlled air pressure control valve per se.

Fig. 10 is a further enlarged view of the float device per se taken from Fig. 7.

Fig. 11 is a further enlarged view of the float device per se taken from Fig. 9.

Figure 1:
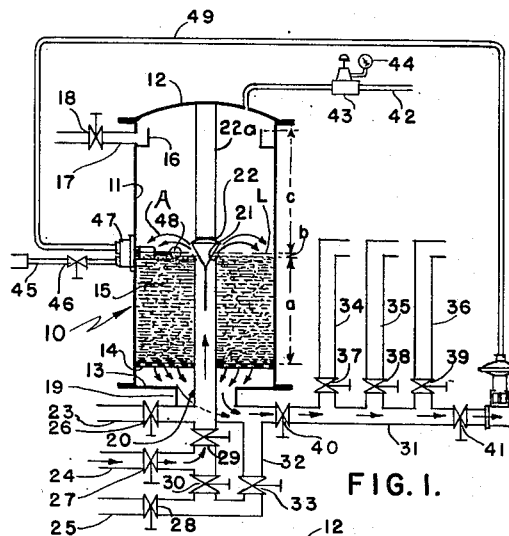

As an example of the environment of this invention there will now be given a description of the operating cycle in the ion exchange treatment of a sugar solution, such as may be derived from beet or cane, although the application of the instrumentalities of this invention is not to be limited to the treatment of such specific solutions.

In the diagrammatic Figures 1 to 6 an exchanger cell 10 is shown to comprise a closed cylindrical tank 11 having a top 12, a bottom 13 and spaced from the bottom a perforated plate or constriction plate or liquid permeable member 14 for supporting a bed 15 of granular exchanger material. At the top the tank 11 is provided with an overflow launder 16 and an overflow discharge pipe 17 having a valve 18. The bottom has a central depression or well portion 19 through which extends a vertical feed induction pipe 20 formed at the top with a flaring portion or valve seat 21 adapted to receive a conical valve member 22, the upward movement of which is confined by a vertical cylindrical or tube-shaped body 22ª coaxial with the feed induction pipe and extending rigidly from the underside of the top of the tank. The bed of exchanger material when settled is shown to have a depth $a$, while the solution level in operation is to be maintained in a predetermined relation to the top of the bed, namely, close to it and, for instance, a relatively small distance $b$ above the bed. The solution level normally to be maintained at the top of the bed is designated by the character L. Above the normal solution level L there is provided a freeboard space $c$ which is the vertical distance between the normal solution level and the overflow edge of launder 16.

The feed induction pipe extends through and a distance downwardly from the well portion 19 and connects with branch feed pipe 23 for regenerant solution, branch feed pipe 24 for juice to be treated, and branch feed pipe 25 for wash water. These branch feed pipes are individually provided with control valves 26, 27 and 28 respectively. The vertical feed induction pipe 20 has a control valve 29 interposed between branch pipes 23 and 24, and a control valve 30 interposed between branch pipes 27 and 28.

From the well portion 19 extends a discharge pipe 31 into which leads a by-pass connection 32 from the branch pipe 28, being provided with a control valve 33. The discharge pipe 31 has three discharge risers or spigot pipes 34, 35 and 36 for different liquids or solutions discharging from the bed in the course of an operating cycle, namely, sugar solution, spent regenerant solution, and drainage water, all as will be explained more fully below. The spigot pipes have control valves 37, 38 and 39 respectively, and are disposed between control valves 40 and 41 provided in the discharge pipe 31.

Fig. 1 shows diagrammatically the disposition of the level control devices comprising the following elements: A compressed air supply pipe 42 leading to the top of the tank, and provided with a control valve 43 for automatically maintaining the air pressure supplied to the tank constantly at a predetermined suitable magnitude, a pressure gauge 44 being shown for indicating such pressure; an air pressure supply pipe 45 having a hand control valve 46 and leading to a control box 47 containing a double-acting valve (to be described further below) governed by a float 48 which in turn is controlled by the liquid level L in the tank. Due to changes of the level L compressed air from pipe 45 is supplied through the control box 47 and a pressure transmitting pipe 49 to a diaphragm controlled discharge valve or throttling device 50 provided in the discharge pipe 31, or else air pressure from the diaphragm of the valve is released to atmosphere, as the case may be when substantially proportionate control effects from the float are transmitted in the form of air pressure impulses to the diaphragm of the valve 50. The valve 50 comprises a membrane $50^a$, and a valve stem $50^b$ guided in a bushing member $50^c$ and surrounded by a coil spring $50^d$ tending to close the valve. An increase of air pressure on the top side of membrane $50^a$ increases the opening of the valve, while a decrease of air pressure on the membrane decreases the opening of the valve.

Details and function of the level control devices appear more clearly from Figs. 7 to 11.

In Fig. 7 the compressed air supply pipe 45 leading to the control box 47 is shown to be provided with an air filter 51, and a control valve 52 similar to the control valve 43 provided in compressed air line 42 in that it automatically maintains the air pressure constant at a selected suitable value, a separate pressure gauge 53 being shown to indicate such maintained air pressure. The air supply line 45 connects with a canal 54 leading to a widened passage 55 in control box 47, in which passage there operates a double-acting valve body 56 adapted to close either upon a lower valve seat 57 or upon an upper valve seat 58. By closing upon the lower seat 57 the valve body opens a connection from canal 54 through passage 55 into a canal 59 leading to the pipe connection 49. When seated closing upon the upper valve seat 58 the valve body interrupts the connection between canal 54 and canal 59, while opening an exhaust passage 60 provided in a plug member 61 which furnishes the bottom closure of the passage or space 55 and also furnishes the lower valve seat 57.

The valve body 56 is urged downwardly upon the lower seat 57 by a coil spring 62 surrounding it. The valve body has a downwardly extending stem portion 63 contacting the head of a bolt 64 adjustably secured by lock nuts 65 and 66 to the outer end of a tongue 67 connected with the float 48 by means of a cap screw member 68 fastened upon the stem $48^a$ of the float 48. The tongue 67 is surrounded by a tubular member 69. At its inner end the tubular member is rigidly fastened in some suitable manner to the cap screw member 68, its intermediate portion has a shoulder 70, while its outer end portion is threaded and provided with a nut 71 so that the tubular member 69 may be rigidly connected with a closure plate 72 confined between the shoulder 70 and the nut 71. The plate 72 closes an opening 73 in the tank wall 11 and is secured by screw bolts 74. The tubular member 69 has a flattened portion 75 forming an upper inward bulge $75^a$ and a lower inward bulge $75^b$ between which bulges the tongue member 67 is confined. A rising or falling of the float 48 will cause corresponding bending deformations of the tubular member at the flattened portion 75. That is to say, a rise of the float will cause a corresponding lengthening and flattening of the bulge $75^b$ while shortening and rendering more convex the bulge $75^a$. Conversely, a falling of the float 48 will cause a corresponding lengthening and flattening of the bulge $75^a$ while shortening and rendering more convex the bulge $75^b$. In accordance with such deformations of the tubular member 75 due to movements of the float 48 the tongue 67 swings slightly up or down thereby actuating the valve member or body 56 governing the operation of the air pressure actuated valve 50. The up and down movement of the float 48 is limited to prevent excessive deformation of the tubular member 75, by a U-shaped bracket 76 bolted as at 77 and 78 to the plate 72 and having an opening 79 through which extends with sufficient clearance the stem $48^a$ of float 48.

This invention will now be described in conjunction with the operation of an ion exchange treatment cycle in the purification treatment of a sugar-bearing solution, as illustrated in Figs. 1 to 6. The arrangement of the liquid level control devices is indicated in Fig. 1, but for the sake of simplicity has been omitted in Figs. 2 to 6.

The solution then passes downwardly through the exchanger bed 15 through the constriction plate 14, and by way of the central well 19 and through the radial pipe 31 out of the cell unit. In accordance with the flow of the sugar solution through the unit as indicated by the arrows, all valves through which the sugar solution is not shown to pass in Fig. 1 are closed.

Figure 2:
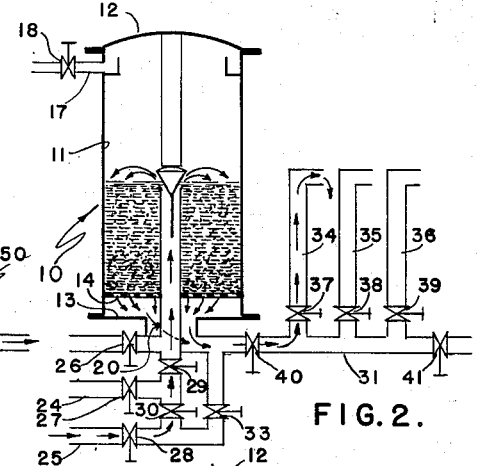

In Fig. 2 the flow of sugar solution down through the bed is shown to have been stopped because the exchange capacity of the bed is now assumed to have been exhausted. The residual sugar solution in the bed must be displaced with wash water before regeneration of the bed can be undertaken. Therefore Fig. 2 shows (by means of arrows) the displacing wash water entering through the water supply pipe 25, and valves 30 and 29, through the induction pipe 20, and against the weight of the valve body 22, into the cell. Due to the pressure it projects in trajectories to zones concentric with the induction valve 22. It passes downwardly through the bed, through the constriction plate 14, the well 19, the valves 40 and 37, and again up the riser 34 whence it discharges. This downflow of wash water is maintained until all the residual sugar solution has been displaced.

Figure 3:
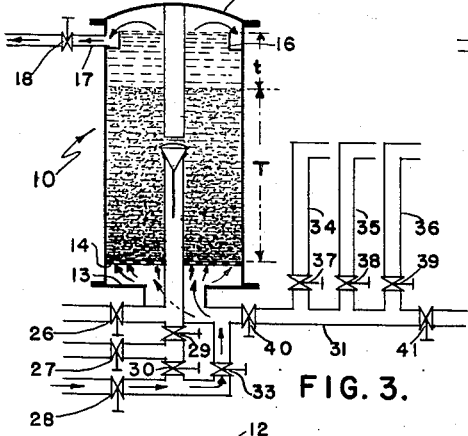
Figure 4:
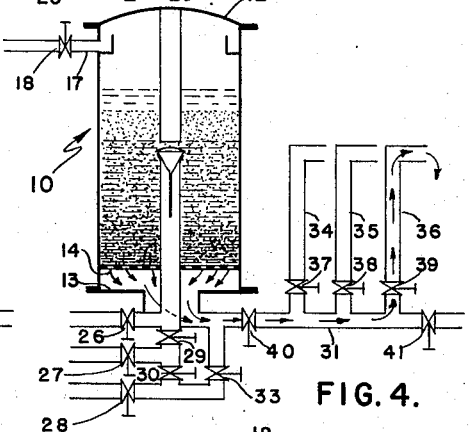

The exchanger bed is now ready for the upwash or teetering operation illustrated in Figs. 3 and 4. This comprises an upflow through the bed of wash liquid whereby solid phase impurities are washed out from the exchanger bed while size stratification of the particles is being established. Wash water enters from the wash water supply pipe 25, passes through the valve 28 and continues through the by-pass connection 32 by way of the valve 33, leading into the central well 19 from where it distributes itself over the space between the constriction plate 14 and the bottom of the cell. As indicated by the arrows, the wash liquid flows upwardly and causes the normally settled exchanger bed to expand upwardly by forming a teeter bed of the depth T in which the particles or grains are kept in suspension by suitable sustained upward flow conditions, and at the same time range themselves in strata according to size, with the smallest particles in the top strata and the coarsest ones at the bottom. Under the flow conditions herein considered, there remains a depth t of clear water between the top of the teeter bed and the point of overflow into the launder 16. During this upflow operating phase the outlet valve 18 at the top of cell is open to permit discharge of spent teeter water, but all other valves at the lower end of the cell, and through which the water is shown to flow, are closed. This sustained teeter condition due to upflowing wash liquid is continued until the solid phase impurities will have been substantially flushed out.

After the exchanger bed has thus been sufficiently cleansed, the particles must be allowed to settle back again, which is effected by permitting excess liquid to drain back through the bottom of the cell that is downward through the constriction plate 14, the central well 19, the pipe 31, valve 40 and again upwardly through the riser 36 from which it overflows at an elevation that corresponds to the liquid level substantially to be maintained above the bed of settled particles in the cell. It will be noted that with the liquid level at the overflow elevation of the riser 36 the exchanger grains will have come to rest and the cell is ready for the regeneration phase. During this draining operation, of course, the valve 18 remains open, but all other valves at the bottom end of the cell through which the draining liquid is not shown to flow, are closed.

Figure 5:
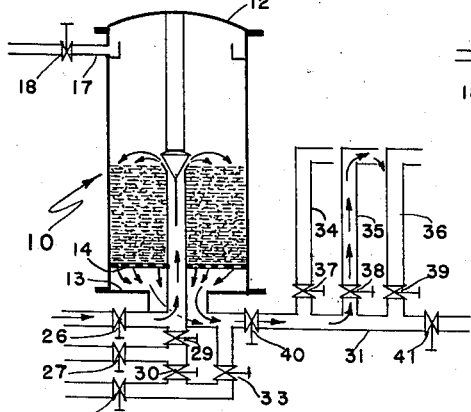

According to Fig. 5 regenerant solution enters the unit from a supply pipe 23 flows through valve 26 and then passes through the central vertical induction pipe 20 substantially in the same manner as described in conjunction with Figs. 1 and 2. At the bottom of the exchanger bed the spent regenerant liquor leaves the unit by way of the central well 19, the pipe 31, the valve 40, and by overflowing from the riser 35. This flow of regenerant solution through the bed is continued until the bed is considered sufficiently regenerated for re-use in the operating cycle, that is, for re-use in purification treatment of the sugar solution. During the operating phase shown in Figs. 1, 2, 5, 6 the automatic control of the liquid level in the cell may be allowed to function as set forth. During the teeter washing phase (see Fig. 3) however, this control is to be inoperative.

Figure 6:
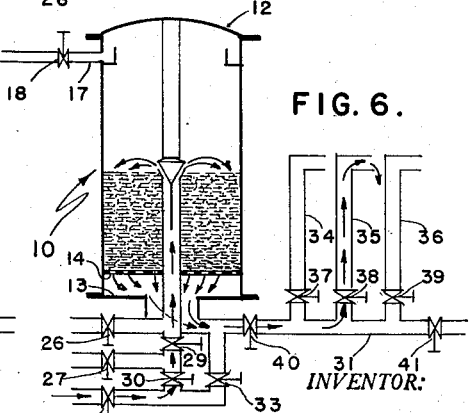

But before sugar solution can again be applied to the exchanger bed, the residual regenerant liquid in the bed must be displaced. This phase of the operating cycle is shown in Fig. 6 where wash water from pipe 25 passes by way of the central vertical induction pipe 20 and then downwardly through the exchanger bed substantially similar to the manner described in conjunction with the sugar solution displacement phase in Fig. 2 except that in Fig. 6 the outflowing liquid leaves the unit by way of the riser 35.

In view of the acidity of the juice and of the acid liquors respectively, to which the interior of the cell and its connections are exposed, their walls are made suitably acid-proof as by rubber coating.

Now with respect to maintaining the level of the sugar solution steady at or near the top of the exchanger bed the control equipment operates as follows:

A tendency towards fluctuation of the liquid level exists for instance due to changes in the hydraulic flow resistance of the exchanger bed in the course of its exhaustion by the sugar solution, such as may be due to a variety of causes among which are the gradual packing down of the exchanger granules and the depositing from the solution of some solid phase matter upon the granules, or a change in the flow rate of the sugar solution.

If due to some such cause the liquid level rises, the control equipment functions to compensate for the rise in hydraulic flow resistance by opening the solution outlet valve 50 a proportionate amount. That is to say, as the float 48 rises it places the valve body 56, through tongue member 75, in its lower position closing off the exhaust opening 60 while establishing airflow connection from the air supply line 45 through the control box 47, that is canals 54, space 55, canal 59 and transfer pipe 49 to the upper side of a membrane 50$^a$ of valve 50, thereby depressing the valve stem 50$^b$ against spring 50$^d$ to increase the opening of the valve. Accordingly as the effluent discharge through the valve increases, the float 48 will drop correspondingly and raise the air control valve body 56 to shut off the air supply from pipe 45 while opening the exhaust opening 60 to compensate in turn for an excessive drop of the liquid level below a predetermined limit by releasing air pressure from the membrane 50$^a$ and correspondingly decreasing the opening of valve 50 by proportionately raising the valve stem 50$^b$.

I claim:

1. In combination a liquid treatment cell comprising a closed receptacle adapted to hold a bed of granular ion exchange material, said receptacle having means for feeding liquid to the top portion of said bed for passage downwardly therethrough, and having means for discharging liquid from the bottom portion of said bed whereby the bed is adapted to be kept in submergence, and a system for controlling the level of the liquid passing downwardly through the bed so as to maintain said level substantially constant comprising a supply conduit for an auxiliary gaseous pressure medium connected with said cell in a manner to exert pressure upon the liquid level, constant pressure control means for maintaining said pressure substantially constant, a throttling device for controlling the rate of discharge of said liquid, and actuating means for said throttling device operable to increase the flow resistance thereof when the liquid level has unduly dropped and to decrease the flow resistance when the level has unduly risen, a float controlled device actuated by said liquid level, and impulse transmitting means for transmitting impulses from said float controlled device to said actuating means whereby a rising of the float in the float controlled device effects a substantially corresponding increase of said flow resistance and a falling of the float effects a substantially corresponding decrease of said flow resistance.

2. A liquid treatment cell according to claim 1, in which said resistance varying means comprise an air pressure actuated valve having an air pressure responsive membrane, a valve member actuated thereby, and spring means counteracting air pressure exerted upon said membrane, in which said float controlled device comprises a double-acting compressed air control valve having a compressed air supply passage, a compressed air discharge passage, and an exhaust passage to atmosphere, which valve in one position is adapted to transmit air pressure from said supply connection to said membrane while shutting the exhaust passage, and in another position adapted to shut said supply connection while connecting said membrane through said exhaust passage with atmosphere, and in which said impulse transmitting means comprise a compressed air supply conduit leading to said supply passage, and an air pressure transmitting conduit leading from said discharge passage to said membrane.

ROBERT C. CAMPBELL.

REFERENCES CITED

The following references are of record in the file of this patent:

UNITED STATES PATENTS

| Number | Name | Date |
| --- | --- | --- |
| 548,458 | Reynolds | Oct. 22, 1895 |
| 1,698,002 | Pink | Jan. 8, 1929 |
| 1,892,951 | Hughes | Jan. 3, 1933 |
| 2,048,158 | Goodwin | July 21, 1936 |
| 2,056,420 | Colby | Oct. 6, 1936 |
| 2,248,322 | Annin | July 8, 1941 |
| 2,365,221 | Shafor | Dec. 19, 1944 |
| 2,376,912 | Green | May 29, 1945 |